United States Patent
Biesemann et al.

(10) Patent No.: US 10,896,206 B2
(45) Date of Patent: Jan. 19, 2021

(54) OFFLINE DEFAULTING SERVICE

(71) Applicant: SAP SE, Walldorf (DE)

(72) Inventors: Thomas Biesemann, Bruchsal (DE); Alexander Fuerbach, Heidelberg (DE)

(73) Assignee: SAP SE, Walldorf (DE)

( * ) Notice: Subject to any disclaimer, the term of this patent is extended or adjusted under 35 U.S.C. 154(b) by 342 days.

(21) Appl. No.: 15/816,153

(22) Filed: Nov. 17, 2017

(65) Prior Publication Data

US 2019/0155939 A1    May 23, 2019

(51) Int. Cl.
| | |
|---|---|
| *G06F 16/28* | (2019.01) |
| *G06F 16/22* | (2019.01) |
| *G06F 16/21* | (2019.01) |
| *G06F 16/84* | (2019.01) |
| *G06F 16/25* | (2019.01) |

(52) U.S. Cl.
CPC .......... *G06F 16/285* (2019.01); *G06F 16/214* (2019.01); *G06F 16/2219* (2019.01); *G06F 16/211* (2019.01); *G06F 16/252* (2019.01); *G06F 16/86* (2019.01)

(58) Field of Classification Search
CPC .... G06F 17/243; G06F 16/214; G06F 16/252; G06F 16/211; G06F 16/86; G06F 17/2264
USPC ................................................. 707/694, 803
See application file for complete search history.

(56) References Cited

U.S. PATENT DOCUMENTS

| | | | |
|---|---|---|---|
| 8,244,778 B1 * | 8/2012 | Wei ...................... | G06F 16/214 |
| | | | 707/803 |
| 8,954,880 B1 * | 2/2015 | Rabe .................. | G06F 3/04847 |
| | | | 715/780 |
| 9,553,918 B1 * | 1/2017 | Manion ................... | G06F 16/00 |
| 2005/0050069 A1 * | 3/2005 | Vaschillo .............. | G06F 16/284 |
| 2006/0085386 A1 * | 4/2006 | Thanu .................... | G06F 40/18 |
| 2006/0123406 A1 * | 6/2006 | Sudhi ..................... | G06F 16/10 |
| | | | 717/168 |
| 2006/0253412 A1 * | 11/2006 | Magarian ............ | G06F 16/2423 |
| 2007/0179939 A1 * | 8/2007 | O'Neil .................. | G06F 16/252 |
| 2009/0187532 A1 * | 7/2009 | Zito ...................... | G06Q 10/00 |
| 2010/0082497 A1 | 4/2010 | Biesemann et al. | |
| 2012/0047079 A1 | 2/2012 | Biesemann et al. | |
| 2014/0006232 A1 | 1/2014 | Viehweger et al. | |

(Continued)

OTHER PUBLICATIONS

U.S. Appl. No. 15/378,647, filed Dec. 14, 2016, Biesemann, Thomas.

*Primary Examiner* — Dangelino N Gortayo
(74) *Attorney, Agent, or Firm* — Fish & Richardson P.C.

(57) ABSTRACT

The present disclosure involves systems, software, and computer implemented methods for providing default values for fields of data objects in an offline mode. One example method includes receiving, at a client device, a default group mapping that includes a default group identifier and a default value to be used as an initial value for a field. A field mapping can be received that includes a default group identifier and a field identifier. A request can be received while the client device is offline to create an instance of an object. A determination can be made that the field mapping includes a field identifier for a field of the object. A default value can be retrieved, from a local repository on the client device. A field value of the field in a created instance of the data object can be set to be the default value.

20 Claims, 4 Drawing Sheets

(56) References Cited

U.S. PATENT DOCUMENTS

2014/0344232 A1* 11/2014 Kludy .................. G06F 17/243
707/694
2015/0121292 A1* 4/2015 Blanco ................. G06F 16/284
715/780
2017/0329984 A1* 11/2017 Clough .............. G06F 21/6227

* cited by examiner

| BO_NAME 202 | BO_NODE_NAME 204 | BO_NODE_FIELD 206 | PARAM_ID 208 |
|---|---|---|---|
| 210 ADDRP_ADDRESS | 216 COMMUNICATION_PREFERENCE | 222 CORRESPONDENCE_LANGUAGE_CODE | 228 AP_CORRESPONDENCE_LANG_CODE |
| 212 BUSINESS_PARTNER_TMPL | 218 COMMON | 224 NON_VERBAL_COMMUNICATION_LANG | 230 AP_CORRESPONDENCE_LANG_CODE |
| 214 LEAN_LEAD | 220 ROOT | 226 ADDRESS_ACCOUNT_CORR_LANGUAGE_CODE | 232 AP_CORRESPONDENCE_LANG_CODE |

| DefaultingGroup 306 | Value 308 |
|---|---|
| 302 AP_CORRESPONDENCE_LANG_CODE 304 | US 306 |

```
<uxc:DataField id="xyz123"             404
  name="PersonNonVerbalCommunicationLanguageCode" type="string"   406
  defaultGroup="AP_CORRESPONDENCE_LANG_CODE" ...
</uxc:DataField>                       410
                                       408
```
402

OFFLINE DEFAULTING SERVICE

TECHNICAL FIELD

The present disclosure relates to computer-implemented methods, software, and systems for providing default values for fields of data objects in an offline mode.

BACKGROUND

A software object can represent a concept in the real world. A software object can model data attributes associated with a given concept as well as actions that may be performed on an instance of the concept. A business object (BO) can represent a concept in the business domain. For example, a sales order business object can represent a sales order. An instance of the sales order business object can be created and can store data values associated with the instance. For example, a sales order instance may have particular values stored for a delivery date and an identifier of a customer who placed the order. The sales order business object can enable actions to be called on the sales order instance, such as creating or cancelling the given sales order.

SUMMARY

The present disclosure involves systems, software, and computer implemented methods for providing default values for fields of data objects in an offline mode. One example method includes receiving, at a client device, a default group mapping that includes a default group identifier and a default value to be used as an initial value for a field. A field mapping can be received that includes a default group identifier and a field identifier. A request can be received while the client device is offline to create an instance of an object. A determination can be made that the field mapping includes a field identifier for a field of the object. A default value can be retrieved, from a local repository on the client device. A field value of the field in a created instance of the data object can be set to be the default value.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 2 is an example table for mapping a business object field to a defaulting group.

FIG. 3 illustrates a mapping that maps default group identifiers to respective default values.

FIG. 4 illustrates code that represents an offline component model.

DETAILED DESCRIPTION

Applications, including business applications, can support an offline mode in which a user can use the application, e.g., on a mobile device, when the mobile device is offline (e.g., not connected to a network). The application can be designed so that features work the same or similarly in an offline mode as in an online mode. A feature that can work the same in offline and online modes is a defaulting service. A defaulting service can retrieve data that has been last entered or provided for a data object (e.g., business object) field and automatically prefill an input field for the data object field with a previously entered value, such as when a new data object instance is being created. Prior solutions required online information to prefill input fields when the application is executing in an offline manner, particularly where prior selections in the online mode were made but no prior selection has been made in the offline mode. Selections made in the online mode were not shared with or provided to the application for application while in the offline mode. Therefore, new inputs made while using the offline mode required resubmission of the prior default values identified in online sessions, which cause users to resubmit information already known by the online system.

As an example, a user can create a new business object that represents a new account. The user can use a user interface to set a country field of the account to a value of "US." If the user creates another new account, the country field for the other new account can be automatically prefilled with the "US" value. As described below, data can be synchronized between a backend server and a mobile device so that the defaulting service can be used regardless of whether the mobile device is online or offline, by allowing default values identified in the online mode to be provided to the application for use in the offline mode. Still further, changes to the default values identified while in the offline mode can be provided to the backend system when a connection is available and the online mode is reengaged. Accordingly, a consistent user-interface experience can be achieved and default selections for the application and its data can be supported in all types of connection modes.

Figure 1:
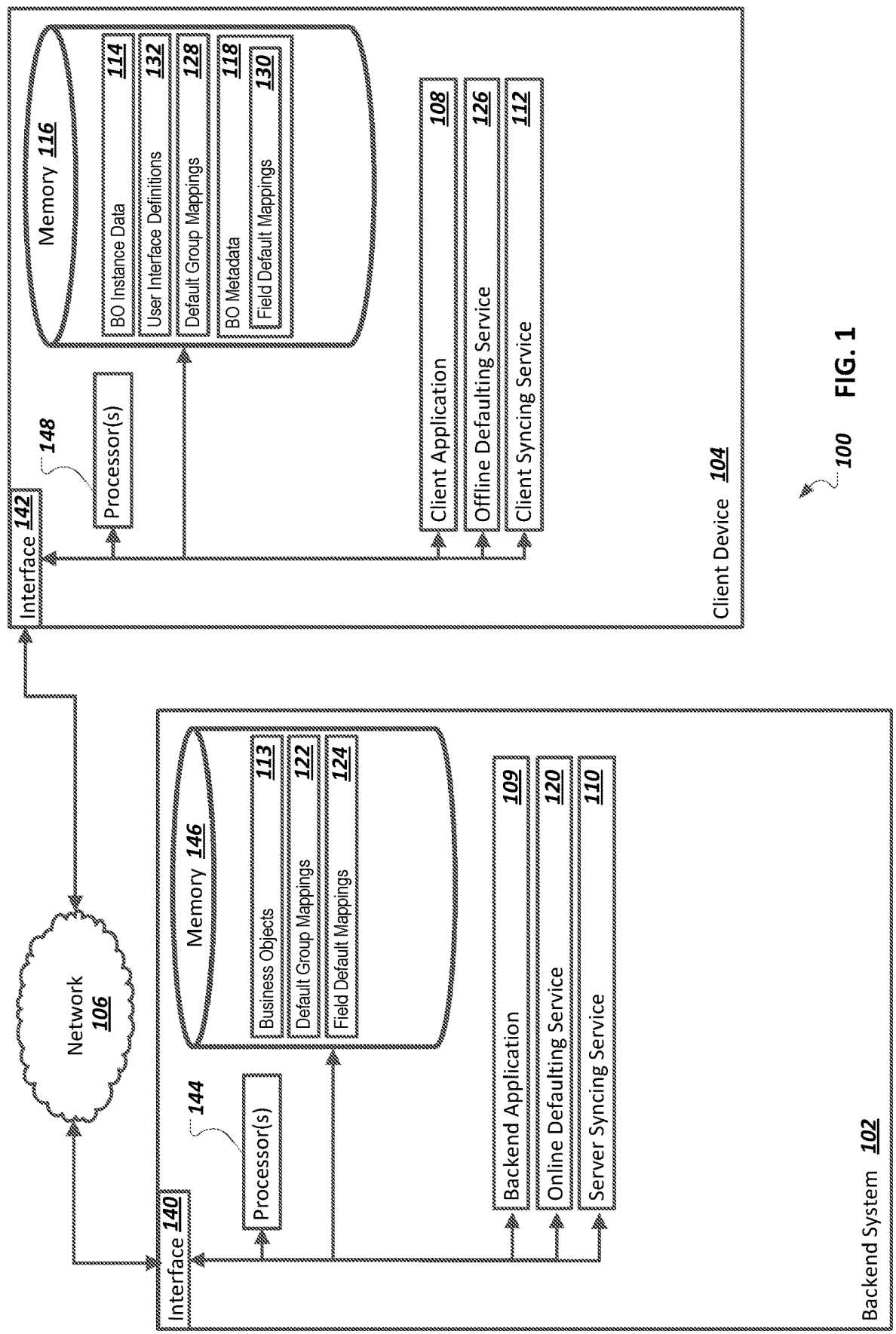
FIG. 1 is a block diagram illustrating an example system for providing default values for fields of data objects in an offline mode.

FIG. 1 is a block diagram illustrating an example system 100 for providing default values for fields of data objects in an offline mode. Specifically, the illustrated system 100 includes or is communicably coupled with a backend system 102, a client device 104, and a network 106. Although shown separately, in some implementations, functionality of two or more systems or servers may be provided by a single system or server. In some implementations, the functionality of one illustrated system or server may be provided by multiple systems or servers.

A client application 108 on the client device 104 is a client version of a server application 109 on the backend system 102. The client application 108 can be configured to work offline (e.g., when the client device 104 is not connected to the network 106). A server syncing service 110 on the backend system 102 can send data to the client device 104 so that the client application 108 can be used when the client device 104 is offline. A client syncing service 112 on the client device 104 can receive the data sent by the server syncing service 110.

The data sent by the server syncing service 110 can include BO instance data of BO objects 113 stored on the backend system 102. The client syncing service 112 can store received BO instance data in a BO instance data area 114 of memory 116. The data sent by the server syncing service 110 can include BO metadata for the BO objects 113, which can be stored by the client syncing service 112 in a BO metadata area 118.

The backend system 102 can store data used by an online defaulting service 120. The online defaulting service 120 can provide default values for use in new instances of BO objects. A default value for a field can be a value that was last saved for the field, or for a related field. For example, if a user enters a value for the field or a related field, the field can later be pre-populated when a BO instance that includes the field (or related field) is subsequently created.

For implementation of the online defaulting service 120, the backend system 102 can store default group mappings 122 and field default mappings 124. Each mapping in the default group mappings 122 includes a respective default group identifier and a corresponding default value to be used as an initial value for one or more BO fields. A default group is a set of BO fields that are linked to a same default value. Example default group mappings are described below with respect to FIG. 3.

The field default mappings 124 map particular BO fields to default groups. Each mapping in the field default mappings 124 includes a respective default group identifier and a corresponding BO field identifier. Example field default mappings are described below with respect to FIG. 2. By mapping the particular BO fields to default groups, those fields can be connected to and consistent with any default values associated with the other BO fields within the default group.

The default group mappings 122 and the field default mappings 124 can be sent by the server syncing service 110 so that an offline defaulting service 126 can replicate the functionality of the online defaulting service 120 when the client device 104 is offline. The default group mappings 122 can be stored by the client syncing service 112 in the memory 116 as local default group mappings 128. In some implementations, the field default mappings 124 are stored in the BO metadata 118 as local field default mappings 130. For example, and as described in more detail below with respect to FIG. 4, metadata 118 for a BO can be stored as an offline component model, for example, as a set of attribute-value pairs. The offline component model for a particular BO, for a particular field, can include a default group attribute with a value of a particular default group identifier.

The offline defaulting service 126 can use the local default group mappings 128 and the local field default mappings 130 when a new BO instance is created on the client device 104 while the client device 104 is offline. For example, the offline defaulting service 126 can determine (or can be informed) that a type of a BO that is being created has a field for which an entry exists in the local field default mappings 130. In other words, the offline defaulting service 126 may know that an instance that is being created has a field that has a corresponding default value. The offline defaulting service 126 can identify an entry in the local field default mappings 130 that includes a field identifier of a field of the BO instance being created. The offline defaulting service 126 can identify a corresponding default group identifier in the identified entry that is mapped to the field identifier. The offline defaulting service 126 can find an entry in the local default group mappings 128 that includes the identified default group identifier, to locate a default value to use for the field.

The default value for the field can be presented in a user interface control of a user interface defined in user interface definitions 132, as an initial value for the field. The user can leave the initial value unchanged, or can change the initial value to a new value. The value in the user interface control (e.g., the initial value or the new value) can be saved as a field value for the BO instance when the BO instance is saved. If the user has changed the initial value to a new value, the new value can be stored, in the local default group mappings 128, as a new default value for the default group associated with the field. If, for example, a second BO instance of the BO type is created, the new value can be used as a default value for the field in the second instance. As another example, if a third BO instance is created, of a BO type that has another field mapped to the same default group identifier, the new value can also be used as a default value for the other field in the third BO instance.

The client syncing service 112 can determine when the client device 104 comes back online after being offline. The client syncing service 112 can send data that may have been changed on the client device 104 while the client device 104 was offline, to the server syncing service 110, for storage in the backend system 102. For example, the client syncing service 112 can send changed BO instance data 114 and changed default values in the local default group mappings 128. If a changed default value is sent from the client syncing service 112 to the server syncing service 110, the changed default value can be stored in a corresponding entry in the default group mappings 122. The changed default value can be retrieved from the default group mappings 112 and used as a default value for an associated field of a BO, if the user creates an instance of the BO while the client device 104 is online. Accordingly, the user does not have to resubmit information, while the client device 104 is online, that was previously entered while the client device 104 was offline.

As used in the present disclosure, the term "computer" is intended to encompass any suitable processing device. For example, although FIG. 1 illustrates a single backend system 102 and a single client device 104, the system 100 can be implemented using a single, stand-alone computing device, two or more backend systems 102 or two or more clients 104. Indeed, the backend system 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the backend system 102 and the client device 104 may be adapted to execute any operating system, including Linux, UNIX, Windows, Mac OS®, Java™, Android™, iOS or any other suitable operating system. According to one implementation, the backend system 102 may also include or be communicably coupled with an e-mail server, a Web server, a caching server, a streaming data server, and/or other suitable server.

Interfaces 140 and 142 are used by the backend system 102 and the client device 104, respectively, for communicating with other systems in a distributed environment—including within the system 100—connected to the network 106. Generally, the interfaces 140 and 142 each comprise logic encoded in software and/or hardware in a suitable combination and operable to communicate with the network 106. More specifically, the interfaces 140 and 142 may each comprise software supporting one or more communication protocols associated with communications such that the network 106 or interface's hardware is operable to communicate physical signals within and outside of the illustrated system 100.

The backend system 102 includes one or more processors 144. Each processor 144 may be a central processing unit (CPU), a blade, an application specific integrated circuit (ASIC), a field-programmable gate array (FPGA), or another suitable component. Generally, each processor 144 executes instructions and manipulates data to perform the operations of the backend system 102. Specifically, each processor 144 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The backend system 102 includes memory 146. In some implementations, the backend system 102 includes multiple memories. The memory 146 may include any type of memory or database module and may take the form of volatile and/or non-volatile memory including, without limitation, magnetic media, optical media, random access memory (RAM), read-only memory (ROM), removable media, or any other suitable local or remote memory component. The memory 146 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the backend system 102.

The client device 104 may generally be any computing device operable to connect to or communicate with the backend system 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the client application 108. A client application is any type of application that allows the client device 104 to request and view content on the client device 104. In some implementations, a client application can use parameters, metadata, and other information received at launch to access a particular set of data from the backend system 102. In some instances, a client application may be an agent or client-side version of the one or more enterprise applications running on an enterprise server (not shown).

The client device 104 further includes one or more processors 148. Each processor 148 included in the client device 104 may be a central processing unit (CPU), an application specific integrated circuit (ASIC), a field-programmable gate array (FPGA), or another suitable component. Generally, each processor 148 included in the client device 104 executes instructions and manipulates data to perform the operations of the client device 104. Specifically, each processor 148 included in the client device 104 executes the functionality required to send requests to the backend system 102 and to receive and process responses from the backend system 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a graphical user interface (GUI) 150.

The GUI 150 of the client device 104 interfaces with at least a portion of the system 100 for any suitable purpose, including generating a visual representation of the client application 108. In particular, the GUI 150 may be used to view and navigate various Web pages. Generally, the GUI 150 provides the user with an efficient and user-friendly presentation of business data provided by or communicated within the system. The GUI 150 may comprise a plurality of customizable frames or views having interactive fields, pull-down lists, and buttons operated by the user. The GUI 150 contemplates any suitable graphical user interface, such as a combination of a generic web browser, intelligent engine, and command line interface (CLI) that processes information and efficiently presents the results to the user visually.

The memory 116 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 116 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the backend system 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

FIG. 2 is an example table 200 for mapping a BO field to a defaulting group. The table 200 is an example of field default mappings. The table 200 includes a BO_NAME column 202, a BO_NODE_NAME column 204, a BO_NODE_FIELD column 206, and a PARAM_ID column 208. The BO_NAME column 202 includes names (or another type of identifier) of BOs that include a field for which a default value has been assigned. For example, records 210, 212, and 214 include BO_NAME values of "ADDRP_ADDRESS" 216, "BUSINESS_PARTNER_TMPL" 218, and "LEAN_LEAD" 220, respectively.

The BO_NODE_NAME column 204 includes names (or another type of identifier) of respective nodes of BOs that include a field for which a default value has been assigned. For example, the records 210, 212, and 214 include node names of "COMMUNICATION_PREFERENCE" 222, "COMMON" 224, and "ROOT" 226, respectively. As indicated in respective cells, the node named "COMMUNICATION_PREFERENCE" 222 includes a field 228 named "CORRESPONDENCE_LANGUAGE_CODE", the node named "COMMON" 224 includes a field 230 named "NON_VERBAL_COMMUNICATION_LANG", and the node named "ROOT" 226 includes a field 232 named "ADDRESS_ACCOUNT_CORE_LANGUAGE_CODE".

Each of the fields 228, 230, and 232 are associated with a default value identified by a default group identifier of "AP_CORRESPONDENCE_LANG_CODE" (e.g., the records 210, 212, and 214 respectively include an "AP_CORRESPONDENCE_LANG_CODE" default group identifier 234, 236, or 238 in the PARAM_ID column 208). When a respective BO instance named "ADDRP_ADDRESS", "BUSINESS_PARTNER_IMPL", or "LEAN_LEAD" is created, a default value associated with the "AP_CORRESPONDENCE_LANG_CODE" default group identifier can be provided for the field 228, 230, or 232, respectively. A default value for the "AP_CORRESPONDENCE_LANG_CODE" default group identifier can be retrieved from a default group that maps a default group identifier to a particular default value.

FIG. 3 illustrates a mapping 300 that maps default group identifiers to respective default values. The mapping 300 is an example of a default group mapping. The mapping 300 can be a table or can be a portion of a table. For example, the mapping 300 can be included in a table that stores personalization data for users. As another example, the mapping 300 can be included in an offline database. For example, the mapping 300 can be included in a default values node that is part of an offline user settings BO that is stored in the offline database.

The mapping 300 includes a record 302 that has a value of "AP_CORRESPONDENCE_LANG_CODE" for a "DefaultingGroup" column 306. The "DefaultingGroup" column 306 can store default group identifiers. The name of the column 306 may be the same or a different value when the mapping 300 is stored an online database or an offline database. The record 302 includes a value 308 of "US" for a "value" column 310, indicating that a default value of "US" is to be used for BO fields (e.g., the fields 228, 230, and 232) that are associated with a defaulting group identifier of "AP_CORRESPONDENCE_LANG_CODE."

FIG. 4 illustrates code 400 that represents an offline component model. The code 400 includes metadata for a modeled offline object. The code 400 can model metadata for BOs of type BUSINESS_PARTNER_TMPL (e.g., representing templates for business partner objects). The code 400 can be a fragment of a model for the BUSINESS_PARTNER_TMPL BO for a "NON_VERBAL_COMMUNICATION_LANG" field (e.g., the field 230 of FIG. 2). An identifier attribute 402, a name attribute 404, and a data type attribute 406 specify an identifier value (e.g., "xyz123") that identifies the modeled field, a name value (e.g., "PersonNonVerbalCommunicationLanguageCode") for the modeled field, and a data type (e.g., string) for the modeled field, respectively.

The code 400 includes a "defaultGroup" attribute 408 that specifies a default group identifier 410 of "AP_CORRESPONDENCE_LANG_CODE". The default group identifier 410 can be used, e.g., when an instance of a BUSINESS_PARTNER_TMPL BO is created in an offline mode, to retrieve a default, initial value for the NON_VERBAL_COMMUNICATION_LANG field 230 of the BUSINESS_PARTNER_TMPL instance. As another example, the default group identifier 410 can be used to retrieve a value to be displayed in a user interface on an offline device (e.g., for a pre-populated user interface control that displays a default value for the field, in a user interface used to create an instance of BUSINESS_PARTNER_TMPL BO). The default value can be retrieved from a data structure stored on the offline device, using the default group identifier 410. For example, a data structure such as the mapping 300 (or a structure that is logically equivalent to the mapping 300) can be queried, using the default group identifier 410, to retrieve a default value (e.g., such as the "US" value 306 or another value).

Figure 5:
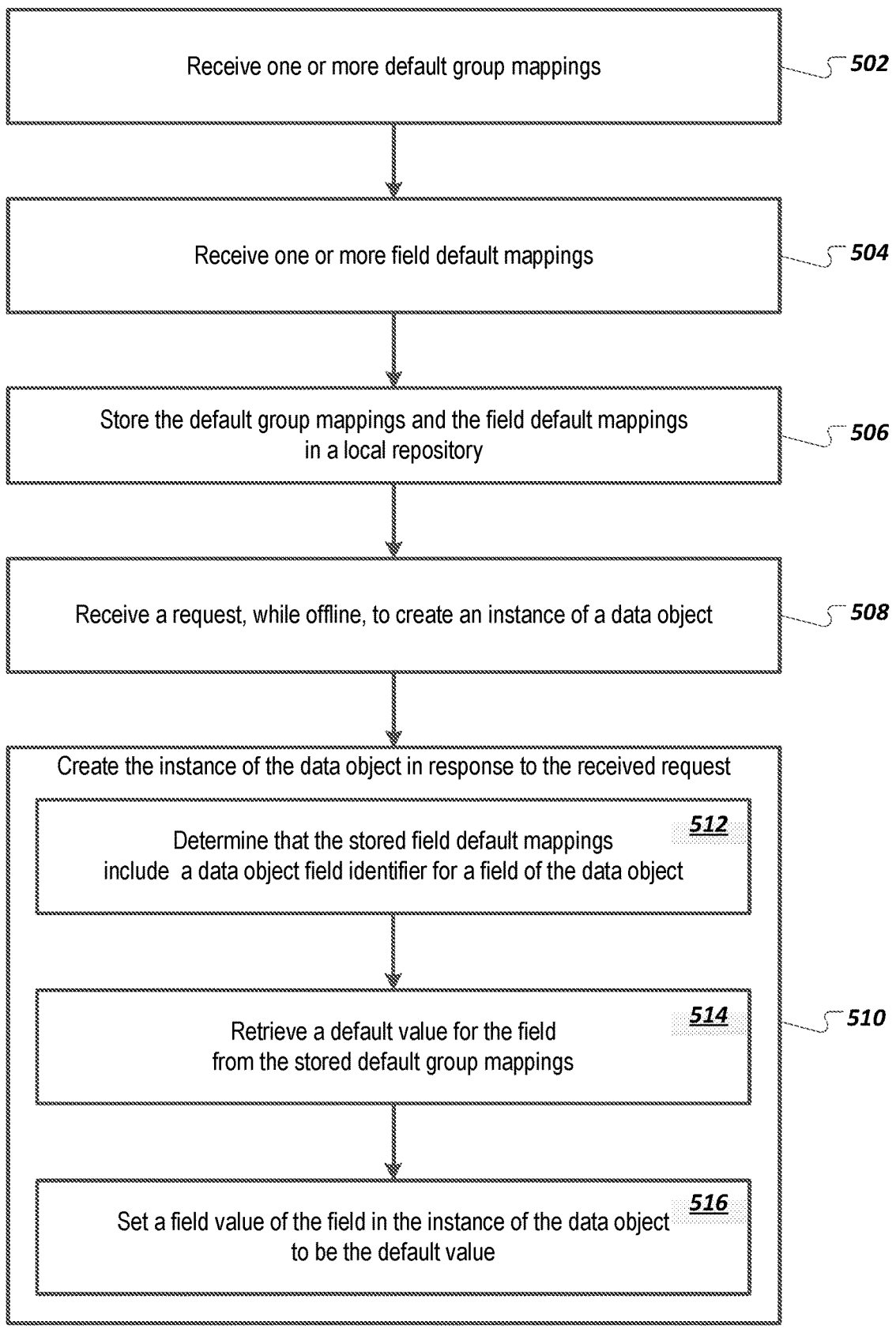
FIG. 5 is a flowchart of an example method for providing default values for fields of data objects in an offline mode

FIG. 5 is a flowchart of an example method 500 for providing default values for fields of data objects in an offline mode. It will be understood that method 500 and related methods may be performed, for example, by any suitable system, environment, software, and hardware, or a combination of systems, environments, software, and hardware, as appropriate. For example, one or more of a client, a server, or other computing device can be used to execute method 500 and related methods and obtain any data from the memory of a client, the server, or the other computing device. In some implementations, the method 500 and related methods are executed by one or more components of the system 100 described above with respect to FIG. 1. For example, the method 500 and related methods can be executed by offline defaulting service 126 and/or the client syncing service 112 of FIG. 1.

At 502, one or more default group mappings are received, at a client device and from a server. Each default group mapping includes a respective default group identifier and a corresponding default value to be used as an initial value for at least one data object field. A data object can be a business object. The default group mappings can be as shown in (or similar to the mappings included in) the mappings 300 of FIG. 3.

At 504, one or more field default mappings are received, at the client device and from the server. Each field default mapping includes a respective default group identifier and a corresponding data object field identifier. Multiple data object fields, of the same or different data objects, can be mapped to a same default group identifier. The field default mappings can be as shown in (or similar to the mappings included in) the table 200 of FIG. 2. The default group mappings and the field default mappings may be received during a synchronization event, such as a full or initial sync with the client device and its applications, or during a delta sync action after an initial synchronization has occurred. In some instances, the information included in 502 and 504 may be received in response to a change at the server or based on changes made during an online session associated with the application executing at the client device, including by a different application instance (e.g., a desktop or laptop application instance) operated by or associated with the same user of the client device, where the application instance on the client device represents a mobile application instance.

At 506, the default group mappings and the field default mappings are stored in a local repository of the client device. The local repository is accessible to the client device when the client device is offline.

At 508, a request is received, while the client device is offline, to create an instance of a first data object associated with the application instance executing at the client device in the offline mode. For example, a user input may be received that is identified as a request to create the instance of the first data object. The client device being offline may mean that a connection is unavailable or that a connection speed or quality is below an online session threshold.

At 510, the instance of the first data object is created in response to the received request in the offline mode of the application. Creating the instance of the first data object can include, at 512, determining that the stored field default mappings include a data object field identifier for a field of the first data object instantiated or to be instantiated. The stored field default mappings can include field identifiers for multiple fields of the first data object.

Creating the instance of the first data object can include, at 514, retrieving, from the local repository, a default value for the field from the stored default group mappings. Retrieving the default value for the field from the stored default group mappings can include: identifying a first field default mapping, in the stored field default mappings, that includes the data object field identifier; identifying, in the first field default mapping, a first default group identifier that corresponds to the data object field identifier; identifying a first default group mapping, in the stored default group mappings, that includes the first default group identifier; and identifying, in the second entry, the default value. The default value can be presented in a user interface control of a user interface presented on the client device. The user can change the default value presented in the user interface control or can leave the presented default value unchanged (e.g., the user can accept the presented default value).

Creating the instance of the first data object can include, at 516, setting a field value of the field in the instance of the data object to be the default value. If the user has changed the presented value to a new value, the field value can be set to be the new value. After the field value has been set, a request can be received (e.g., from the user interface) to save the instance of the data object. Data for the instance of the data object, including the field value, can be stored in the local repository. If the user has changed the presented default value to a new value, the new value can be saved, in the default group mappings, as a new default value, in association with the default group identifier.

Figure 6:
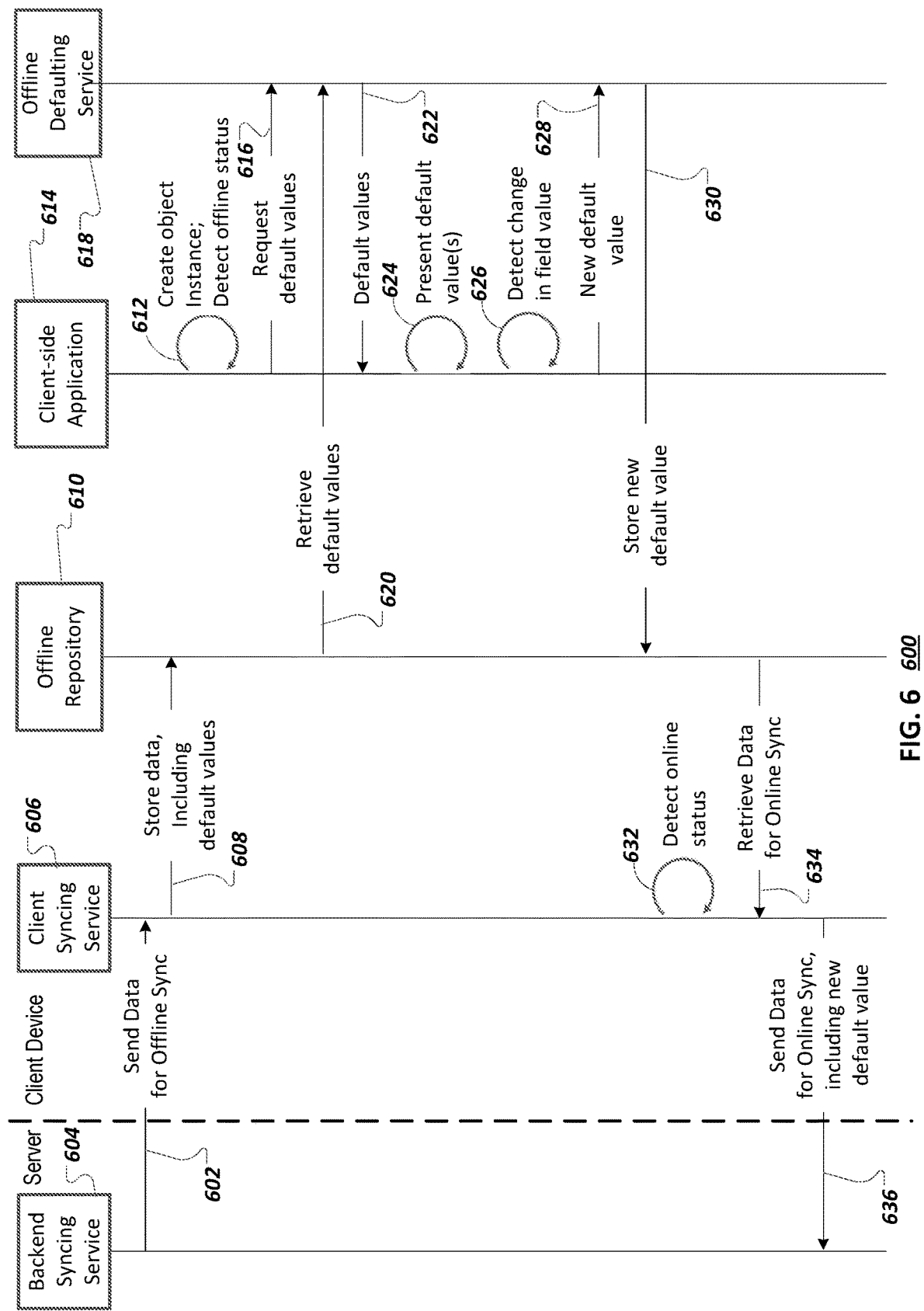
FIG. 6 is a swim lane of a method for providing default values for fields of data objects in an offline mode.

FIG. 6 is a swim lane of a method 600 for providing default values for fields of data objects in an offline mode. At 602, a backend syncing service 604 of a server sends data to a client syncing service 606 on a client device as part of a data synchronization process that enables the client device to use data sent by the server, when the client device is offline.

At 608, the client syncing service stores the received data in an offline repository 610 on the client device. The received data includes one or more default values for BO fields.

At 612, a client-side application 614 (e.g., a client version of a server application) creates an object instance of a particular type of BO, e.g., in response to receiving a user input on a user interface. The client-side application 614 detects that the client device is offline.

At 616, the client-side application 614 sends a request for default values to an offline defaulting service 618.

At 620, the offline defaulting service 618 retrieves requested default values from the offline repository 610.

At 622, the offline defaulting service 618 provides the retrieved default values to the client-side application 614.

At 624, the client-side application 614 presents the provided default values in a user interface, e.g., to populate user interface controls with default values for corresponding BO fields.

At 626, the client-side application 614 detects a change in a user interface control that initially displayed a provided default value for a particular field. For example, the user may have changed an initially displayed value to a changed field value.

At 628, the client-side application 614 provides the changed field value as a new default value for the particular field to the offline defaulting service 618.

At 630, the offline defaulting service 618 stores the new default value in the offline repository 610.

At 632, the client syncing service 606 determines that the client device is online.

At 634, the client syncing service 606 retrieves data, including the new default value, from the offline repository 610.

At 636, the client syncing service 606 sends data retrieved from the offline repository 610, over a network, to the backend syncing service 604. The data sent to the backend syncing service 604 includes the new default value. The backend syncing service can communicate with a server defaulting service (not shown), to request that the new default value be stored for the particular field.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
   receiving, at a client device and from a server, one or more default group mappings, wherein each default group mapping includes a respective default group identifier and a corresponding default value to be used as an initial value for at least one data object field;
   receiving, at the client device and from the server, one or more field default mappings, wherein each field default mapping includes a respective default group identifier and a corresponding data object field identifier;
storing the default group mappings and the field default mappings in a local repository of the client device;
determining whether the client device is offline, wherein determining that the client device is offline indicates that a connection to the server is unavailable, or that a connection speed or quality of a connection to the server is below an online session threshold, and wherein determining that the client device is not offline indicates that the client device is connected to the server;
in response to determining that the client device is offline:
receiving a request, while the client device is offline, to create an instance of a first data object; and
creating the instance of the first data object in response to the received request, wherein creating the instance of the first data object includes:
determining that the stored field default mappings include a data object field identifier for a field of the first data object;
retrieving, from the local repository, a default value for the field from the stored default group mappings, wherein the default value was identified and received from the server while the client device was online; and
setting a field value of the field in the instance of the data object to be the default value; and
in response to determining that the client device is not offline:
receiving a request to create an instance of a second data object; and
creating the instance of the second data object in response to the received request, wherein creating the instance of the second data object includes:
retrieving, from the server, a default value for a field of the second data object, wherein the default value for the field of the second data object is identified and received from the server while the client device is online; and
setting a field value of the field in the instance of the second data object to be the default value.

2. The method of claim 1, wherein retrieving the default value for the field from the stored default group mappings comprises:
identifying a first field default mapping, in the stored field default mappings, that includes the data object field identifier;
identifying, in the first field default mapping, a first default group identifier that corresponds to the data object field identifier;
identifying a first default group mapping, in the stored default group mappings, that includes the first default group identifier; and
identifying, in a second entry, the default value.

3. The method of claim 2, further comprising:
receiving a request to save the instance of the data object; and
storing data for the instance of the data object in the local repository, wherein storing data for the instance of the data object comprises storing the field value for the field.

4. The method of claim 3, further comprising presenting the default value in a user interface control of a user interface presented on the client device, and wherein the request to save the instance of the data object is received from the user interface.

5. The method of claim 4, further comprising:
receiving an input, for the user interface control, identifying a change to the default value to a changed value;
setting the field value to be the changed value; and
wherein storing data for the data object instance comprises storing the changed value as the field value.

6. The method of claim 5, further comprising:
storing the changed value, as an updated default value, in the first default group mapping, in association with the first default group identifier.

7. The method of claim 6, further comprising:
determining whether the client device is online; and
in response to determining that the client device is online:
sending the data for the instance of the data object, including the changed value, to the server;
retrieving the stored default group mappings from the local repository; and
sending, to the server, the retrieved default group mappings, wherein the updated default value in the first default group mapping of the retrieved default group mappings was identified while the client device was offline; and
in response to determining that the client device is not online:
receiving a request to save the instance of the second data object; and
storing data for the instance of the second data object in the local repository, wherein storing data for the instance of the second data object comprises storing the field value for the field in the instance of the second data object.

8. The method of claim 5, wherein the first default group identifier is mapped, in the field default mappings, to multiple fields of multiple data objects, and wherein the multiple data objects include the first data object.

9. The method of claim 8, wherein the multiple data objects include a third data object, the method further comprising:
receiving a request to create an instance of the third data object;
creating an instance of the third data object;
determining that the stored field default mappings include a data object field identifier for a second field of the third data object;
retrieving, from the local repository and in the first default group mapping, the changed value as a third default value for the second field; and
setting a field value of the second field in the instance of the third data object to be the third default value.

10. A system comprising:
one or more computers; and
a computer-readable medium coupled to the one or more computers having instructions stored thereon which, when executed by the one or more computers, cause the one or more computers to perform operations comprising:
receiving, at a client device and from a server, one or more default group mappings, wherein each default group mapping includes a respective default group identifier and a corresponding default value to be used as an initial value for at least one data object field;
receiving, at the client device and from the server, one or more field default mappings, wherein each field default mapping includes a respective default group identifier and a corresponding data object field identifier;

storing the default group mappings and the field default mappings in a local repository of the client device;

determining whether the client device is offline, wherein determining that the client device is offline indicates that a connection to the server is unavailable, or that a connection speed or quality of a connection to the server is below an online session threshold, and wherein determining that the client device is not offline indicates that the client device is connected to the server;

in response to determining that the client device is offline:
  receiving a request, while the client device is offline, to create an instance of a first data object; and
  creating the instance of the first data object in response to the received request, wherein creating the instance of the first data object includes:
    determining that the stored field default mappings include a data object field identifier for a field of the first data object;
    retrieving, from the local repository, a default value for the field from the stored default group mappings, wherein the default value was identified and received from the server while the client device was online; and
    setting a field value of the field in the instance of the data object to be the default value; and in response to determining that the client device is not offline:
  receiving a request to create an instance of a second data object; and
  creating the instance of the second data object in response to the received request, wherein creating the instance of the second data object includes:
    retrieving, from the server, a default value for a field of the second data object; and
    setting a field value of the field in the instance of the second data object to be the default value.

11. The system of claim 10, wherein retrieving the default value for the field from the stored default group mappings comprises:
  identifying a first field default mapping, in the stored field default mappings, that includes the data object field identifier;
  identifying, in the first field default mapping, a first default group identifier that corresponds to the data object field identifier;
  identifying a first default group mapping, in the stored default group mappings, that includes the first default group identifier; and
  identifying, in a second entry, the default value.

12. The system of claim 11, wherein the operations further comprise:
  receiving a request to save the instance of the data object; and
  storing data for the instance of the data object in the local repository, wherein storing data for the instance of the data object comprises storing the field value for the field.

13. The system of claim 12, wherein the operations further comprise presenting the default value in a user interface control of a user interface presented on the client device, and wherein the request to save the instance of the data object is received from the user interface.

14. The system of claim 13, wherein the operations further comprise:

receiving an input, for the user interface control, identifying a change to the default value to a changed value;
setting the field value to be the changed value; and
wherein storing data for the data object instance comprises storing the changed value as the field value.

15. The system of claim 14, wherein the operations further comprise storing the changed value, as an updated default value, in the first default group mapping, in association with the first default group identifier.

16. A computer program product encoded on a non-transitory storage medium, the product comprising non-transitory, computer readable instructions for causing one or more processors to perform operations comprising:
  receiving, at a client device and from a server, one or more default group mappings, wherein each default group mapping includes a respective default group identifier and a corresponding default value to be used as an initial value for at least one data object field;
  receiving, at the client device and from the server, one or more field default mappings, wherein each field default mapping includes a respective default group identifier and a corresponding data object field identifier;
  storing the default group mappings and the field default mappings in a local repository of the client device;
  determining whether the client device is offline, wherein determining that the client device is offline indicates that a connection to the server is unavailable, or that a connection speed or quality of a connection to the server is below an online session threshold, and wherein determining that the client device is not offline indicates that the client device is connected to the server;
  in response to determining that the client device is offline:
    receiving a request, while the client device is offline, to create an instance of a first data object; and
    creating the instance of the first data object in response to the received request, wherein creating the instance of the first data object includes:
      determining that the stored field default mappings include a data object field identifier for a field of the first data object;
      retrieving, from the local repository, a default value for the field from the stored default group mappings, wherein the default value was identified and received from the server while the client device was online; and
      setting a field value of the field in the instance of the data object to be the default value; and
  in response to determining that the client device is not offline:
    receiving a request to create an instance of a second data object; and
    creating the instance of the second data object in response to the received request, wherein creating the instance of the second data object includes:
      retrieving, from the server, a default value for a field of the second data object; and
      setting a field value of the field in the instance of the second data object to be the default value.

17. The computer program product of claim 16, wherein retrieving the default value for the field from the stored default group mappings comprises:
  identifying a first field default mapping, in the stored field default mappings, that includes the data object field identifier;

identifying, in the first field default mapping, a first default group identifier that corresponds to the data object field identifier;

identifying a first default group mapping, in the stored default group mappings, that includes the first default group identifier; and identifying, in a second entry, the default value.

18. The computer program product of claim 17, wherein the operations further comprise:

receiving a request to save the instance of the data object; and storing data for the instance of the data object in the local repository, wherein storing data for the instance of the data object comprises storing the field value for the field.

19. The computer program product of claim 18, wherein the operations further comprise presenting the default value in a user interface control of a user interface presented on the client device, and wherein the request to save the instance of the data object is received from the user interface.

20. The computer program product of claim 19, wherein the operations further comprise:

receiving an input, for the user interface control, identifying a change to the default value to a changed value;

setting the field value to be the changed value; and wherein storing data for the data object instance comprises storing the changed value as the field value.

* * * * *